INFORMATION STORAGE TIMING ARRANGEMENT

Filed April 15, 1966 2 Sheets-Sheet 1

INVENTOR
J. SLIWKOWSKI
BY D. E. Snedeker
ATTORNEY

INFORMATION STORAGE TIMING ARRANGEMENT

Filed April 15, 1966 2 Sheets-Sheet 2

United States Patent Office 3,394,355

Patented July 23, 1968

3,394,355

INFORMATION STORAGE TIMING ARRANGEMENT

Joseph Sliwkowski, Rochester, N.Y., assignor to Bell Telephone Laboratories, Incorporated, New York, N.Y., a corporation of New York Filed Apr. 15, 1966, Ser. No. 542,965
9 Claims. (Cl. 340—172.5)

Figure 1:
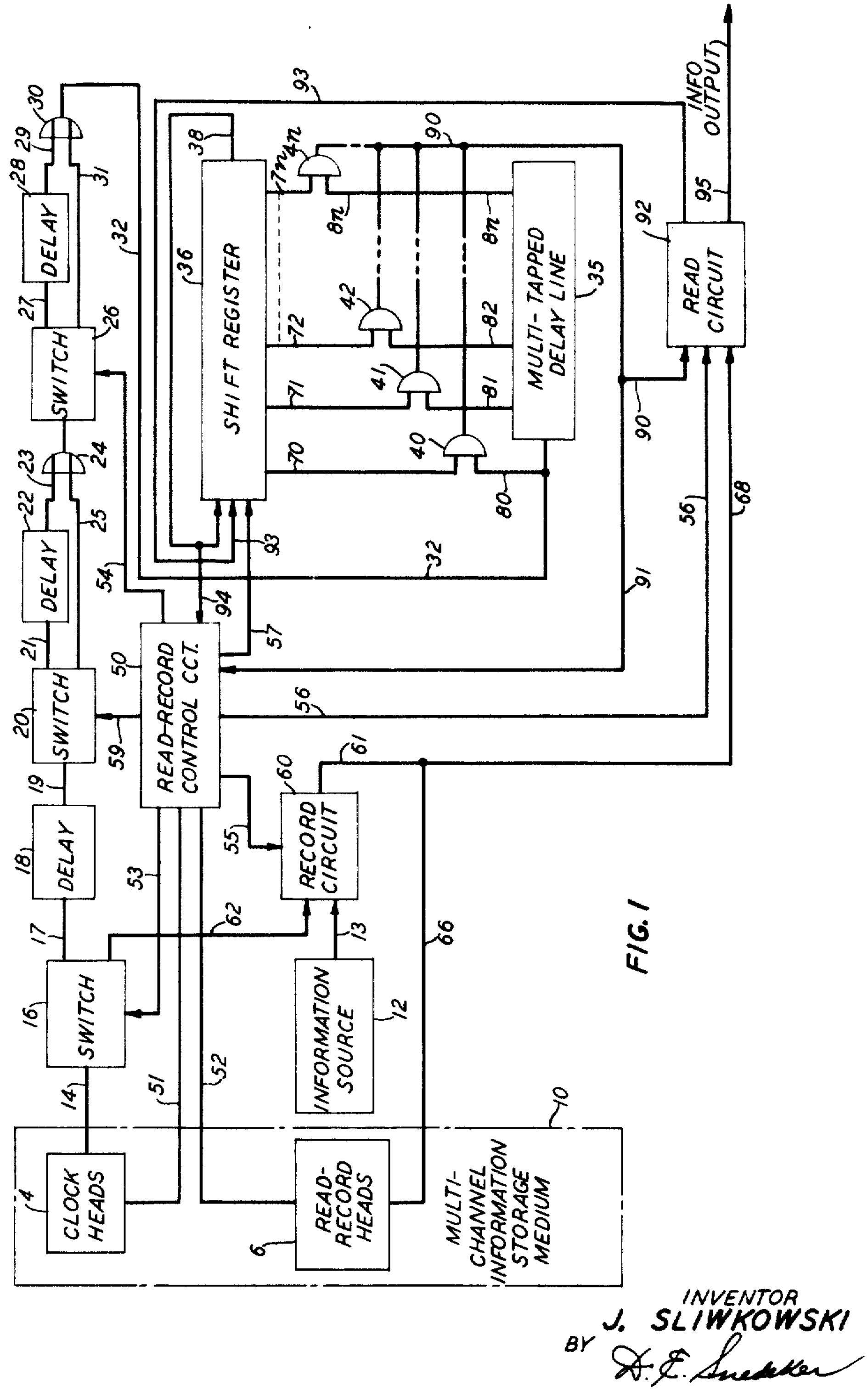

This invention relates to information storage systems and more particularly to timing arrangements for timing the transfer of information to and from multichannel information storage mediums.

In information storage systems employing multiple channel storage mediums, such as a magnetic disk or drum, it is well known to associate individual transducers with each of the storage channels and to utilize one or more transducers associated with clock channels disposed on the storage medium to control the timing of the transfer of information to and from the storage medium. The clock channel or channels generally provide an individual timing or clock pulse associated with each discrete storage location within the respective storage channels of the storage medium, such as for each bit storage location, and further often provide a clock pulse associated with predetermined locations therein, such as at the beginning of each word block or each sector in the respective storage channels. It is also well known in the case of magnetic disk storage mediums to divide each storage disk of the medium into a number of concentric storage zones and to utilize separate timing channels for the respective storage zones, transfer of information to and from the storage channels in the respective zones being effected at discrete zone frequencies in accordance with clock pulses from the individual zone timing channels.

It has been recognized that even though a bit of information is transferred to the storage medium and recorded in a storage location precisely synchronized with a particular clock pulse, the position of the corresponding readout signal with respect to that clock pulse can vary significantly so as to affect proper readout in a high density storage system. This readout variation is sometimes referred to as copy delay, and principally comprises logic delays due to the particular read-record circuitry and transducer delays due to variations between the individual transducers associated with the respective storage channels. The logic delay is the same for all of the storage channels in the system, assuming common read-record circuitry, and it is constant except for a change due to the changing of a circuit or circuit component in the read-record circuitry. However, the delays due to transducer variations may differ from channel to channel in the system, since each channel has associated therewith its own individual transducer.

Heretofore, this problem has been eliminated through the use of a self-clocking form of recording which does not require individual bit clock pulses for readout, or the problem has been minimized by manual timing adjustments to provide a predetermined positional relationship between the bit clock pulses and the bit storage locations during readout. Many applications do not admit advantageously to either of these solutions. The manual timing adjustments must be made typically each time the system is placed in operation and must be remade subsequently from time to time as components age or are changed. This, of course, means that an average timing adjustment must be made to compensate for the delays due to the different transducer variations for the various storage channels, or that an adjustment must be made individually for each storage channel. Further, additional timing problems arise randomly from time to time due to mechanical jitter in the system and due to temperature fluctuations between the time the information is recorded and the time it is read out.

It is, therefore, a general object of this invention to provide a simple, compact and economical arrangement for accurately controlling the timing of the transfer of information to and from a multichannel information storage medium.

More particularly, it is an object of this invention to provide a simple and economical timing arrangement which automatically compensates for copy delay and other readout timing variations with respect to the various storage channels in a multichannel magnetic storage system.

A further object of this invention is to provide an arrangement for automatically adjusting the timing relationship between common clock pulses and information read from individual storage channels of a multichannel storage system to be substantially the same as the timing relationship between the common clock pulses and the information during recording of the latter.

In accordance with a feature of my invention, the above and other objects are attained in an illustrative embodiment of an information storage timing arrangement employing respective patterns of check bits recorded in the individual storage channels of a multichannel information storage system for controlling clock pulse timing during readout of information from the individual storage channels. A respective pattern of check bits is recorded advantageously, for example, in each storage channel immediately preceding each information storage area or sector within the respective storage channels. Just prior to readout of information from a storage area or sector within one of the channels, the check bits preceding that storage sector are read out and utilized to adjust the timing of the clock pulses until a desired timing relationship exists with the check bits, and thus with the information in the succeeding storage area.

According to a further feature of my invention, the check bits are employed in conjunction with an arrangement for adjusting the timing of the clock pulses incrementally, via a multitapped delay line, until coincidence occurs between a clock pulse and the leading edge of a check bit. A fixed delay of one-half bit period is then switched in to nominally center the clock pulses in the bit periods for information readout, thereby compensating for any timing variations between the information recording and readout operations.

A further feature of my invention relates to circuitry operative prior to readout for automatically adjusting the clock pulse timing an initial amount equal to the minimum timing adjustment necessary for proper readout, thereby minimizing the time necessary for clock timing adjustments and minimizing the number of check bits and the delay line incrementation required to achieve the desired timing relationship.

The above and other objects and features of the present invention may be fully apprehended from the following detailed description when considered with reference to the accompanying drawing in which:

FIG. 1 shows an illustrative embodiment of an information storage timing arrangement in accordance with the principles of the invention; and FIGS. 2A through 2D show various waveforms useful in describing the operation of the invention.

The illustrative embodiment of the invention shown in FIG. 1 of the drawing is depicted in an information storsystem for transferring information to and from respective information storage channels of multichannel information storage medium 10. Storage medium 10 may comprise, for example, an arrangement of one or more magnetic disks or magnetic drums, each having a plurality of concentric or parallel information storage channels. As is well known in the art, a plurality of transducers or read-record heads 6 may be individually associated with respective ones of the storage channels for recording information in and reading information out of the respective storage channels. Read-record heads 6 are individually selected for connection over leads 66 and 68 to read circuit 92 during read operation by read-record control circuit 50 via lead 52. Similarly, read-record control circuit 50 is employed for head selection purposes during recording operation to connect individual ones of read-record heads 6 over leads 66 and 61 to record circuit 60.

Each of the information storage channels of storage medium 10 comprises a plurality of individual storage locations in which respective bits of information may be recorded. The bit storage locations in each storage channel are assumed to be arranged in information word blocks and in storage sectors as is well known in the art. For example, the storage channels may be arranged in a plurality of sequential storage sectors, the storage channels each containing a plurality of multibit word locations within the individual storage sectors.

Timing for the transfer of information to and from the various storage channel locations is controlled by one or more clock channels disposed on storage medium 10 which, via clock heads 4, provide suitable clock pulses on lead 14. The clock channels provide individual clock pulses associated with each bit storage location and, further, provide clock pulses associated with predetermined locations within each storage channel, such as the start of each of the storage sectors. Moreover, it is known to divide each disk face of a magnetic disk storage medium into a number of multichannel concentric zones and to utilize separate clock channels for bit timing of the respective zones, transfer of information to and from the storage channels in the respective zones being effected at distinct zone frequencies in accordance with clock pulses from the individual zone clock channels. In such a magnetic disk storage medium, the clock head 4 associated with the appropriate zone clock channel is selected by read-record control circuit 50 over lead 51.

Information from information source 12 is provided over lead 13 to record circuit 60 for recording in particular locations in the individual storage channels of storage medium 10. Recording of the information may be accomplished in any of the known forms. However, it will be assumed herein for the purposes of description that a non-return-to-zero form of recording is used wherein one polarity of magnetization represents a binary one and the other polarity represents a binary zero, a transi ion between magnetization polarities occurring only when the character of a bit changes from that of its immediate predecessor. Clock pulses are provided on lead 14, in the manner described above, through switch 16 under the control of read-record control circuit 50 and over lead 62 to record circuit 60. The recording of information by record circuit 60 is thus effected in distinct bit storage locations on storage medium 10 defined by the respective bit clock pulses provided on lead 62.

During readout of the recorded information the readout signal on lead 68 must be sampled or strobed under control of respective clock pulses on lead 90 to determine the polarity of magnetization in the individual bit locations. Even though a bit of information is recorded in a bit storage location precisely synchronized with a particular clock pulse, the position of the readout signal with respect to that clock pulse can vary significantly. This may be due, for example, to logic delays presented by the particular read-record circuitry and to delays presented by variations between the read-record heads associated with the respective information storage channels.

Figure 2A:
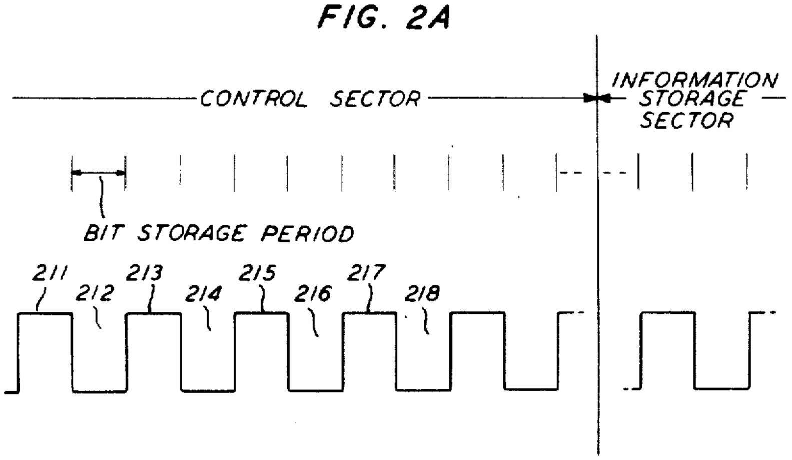

In accordance with my invention, a pattern of timing check bits is recorded in each storage channel, advantageously preceding each information storage sector. The check bits are employed just prior to readout of information from the storage sector to adjust the timing of the clock pulses on lead 90 until the desired timing relationship exists with the check bits, and thus with the information to be read out from the succeeding storage area. By way of example, the pattern of check bits may be alternate binary ones and zeros to provide a series of magnetization transitions for timing adjustment, as shown in FIG. 2A. These check bits may be recorded in the control space or sector which is normally provided between storage sectors to permit time for such operations as switching between storage channels, receiving read or record instructions, switching between read and record circuitry, and the like. In this manner, the check bits recorded in the information storage channels do not decrease the information storage density nor the quantity of information that can be recorded in the respective storage channels.

The particular illustrative embodiment shown in FIG. 1 of the drawing for utilizing the recorded check bits to automatically compensate for copy delay and other readout timing variations comprises delay circuits 18, 22, and 28 having fixed periods of delay, and multi-tapped delay line 35 having a plurality of outputs 81 through **8*n* for selectively providing a variable period of delay. Delay circuit 18 provides a fixed period of delay to compensate for the minimum readout timing adjustment that it necessary for the particular system. Delay circuit 18 is switched into the read clock pulse path between lead 14 and lead 90 by the operation of switch 16, under the control of read-record control circuit 50 over lead 53, at the time read operation is initiated. Delay circuits 22 and 28 each provide fixed predetermined periods of delay and are individually switched into the read clock pulse path by the operation of respective switches 20 and 26 under the control of read-record control circuit 50 over respective leads 59 and 54. The variable amount of delay connected into the read clock pulse path by delay line 35 during readout is controlled incrementally by shift register 36** in the manner described below.

For the purposes of describing the operation of the information storage timing arrangement in FIG. 1 of the drawing, assume that an information bit period is 500 nanoseconds and that the minimum readout timing delay variation for the system is approximately one-half bit period, or 250 nanoseconds. Thus, delay circuit 18 provides a fixed delay period of 250 nanoseconds. Delay circuits 22 and 28 are each assumed to provide fixed periods of delay of one-fourth bit period, or 125 nanoseconds each. It will be further assumed, by way of example, that eight check bits 211 through 218 are recorded in the control sector preceding each information storage sector, as depicted in FIG. 2A of the drawing, and that delay line 35 has a total length of 350 nanoseconds with 7 output leads 81 through **8*n*** connected thereto at substantially equally spaced intervals of 50 nanoseconds.

During the recording of information in storage medium 10, clock pulses on lead 14 are directed through switch 16 over lead 62 to record circuit 60 without the interposition of any delays. When an instruction is received to read out recorded information from storage medium 10, read-record control circuit 50 operates switch 16 via lead 53 and enables read circuit 92 via lead 56. The operation of switch 16 directs clock pulses on lead 14 therethrough over lead 17 and through delay circuit 18 to lead 19. Delay circuit 18 thus delays the clock pulses appearing on lead 14 during readout by an initial amount equal to 250 nanoseconds.

Clock pulses on lead 19 are directed, under the control of read-record control circuit 50, through switch 20, over lead 25, through OR gate 24 and switch 26, over lead 31 and through OR gate 30 to lead 32. Neither of delay circuits 22 and 28 are connected in the clock pulse path at this point in the operation.

Figure 2B:
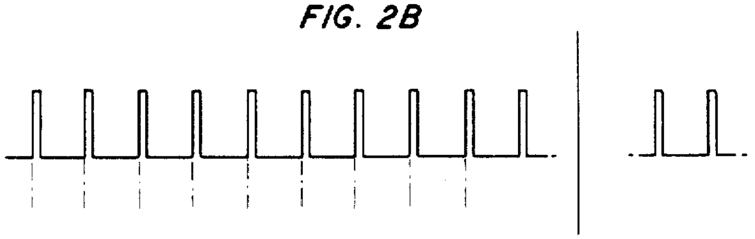

Shift register 36 is a recirculating shift register and has stored therein a single binary bit which may be shifted from left to right in FIG. 1 through the successive stages of shift register 36 by successive advance pulses on lead 93. Shift register output leads 70 through 7$n$ are individually connected to respective stages of shift register 36, and an output signal is provided on one of leads 70 through 7$n$ according to which shift register stage the bit is currently registered in. Initially, the bit is registered in the first stage of shift register 36, providing an output signal on lead 70 to enable gate 40. Accordingly, clock pulses on lead 32 are directed over lead 80 through gate 40 and over lead 90 to read circuit 92. FIG. 2B shows the clock pulses as they appear on lead 90 to read circuit 92 in the absence of any further timing adjustment.

Figure 2C:
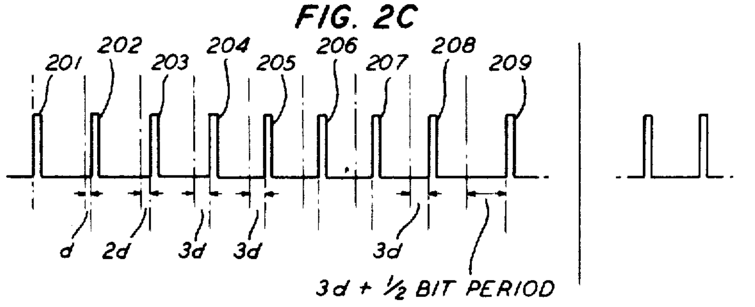

In the illustrative example shown in FIG. 2C of the drawing, the readout timing variation is assumed to be such that the first clock pulse appearing on lead 90 during readout of the check bits on lead 68, that is clock pulse 201, does not coincide with a check bit transition. In the absence of such coincidence, read circuit 92 provides a signal on lead 93 to advance the bit in shift register 36 to the next successive stage, providing a signal on lead 71 to enable gate 41 and disabling gate 40. The next clock pulse on lead 32 during readout of the check bits on lead 68, therefore, clock pulse 202, is directed through a portion of delay line 35, over output lead 81, through enabled gate 41 to lead 90. Clock pulse 202 on lead 90 is thus delayed through delay line 35 by a predetermined period of delay $d$, illustratively 50 nanoseconds, as shown in FIG. 2C.

If coincidence does not occur between clock pulse 202 and a check bit transition, read circuit 92 again provides a signal on lead 93 to advance shift register 36, enabling gate 42 via lead 72 and disabling gate 41. Accordingly, clock pulse 203 is directed through a portion of delay line 35 to output lead 82 and through enabled gate 42 to lead 90, delayed by an additional predetermined period of delay $d$ of 50 nanoseconds, or a total delay of $2d$ as shown in FIG. 2C. This manner of operation continues, incrementing the clock pulse delay on lead 90 until coincidence is obtained between one of clock pulses 201 through 208 and a check bit transition. Such coincidence is assumed to occur, by way of example, with clock pulse 204 in the illustrative example of FIG. 2C.

Responsive thereto, read circuit 92 halts the advance of shift register 36 by failing to direct any further advance signals thereto on lead 93, and shift register 36 remains in its then current state, continuing to enable gate 42. Successive ones of clock pulses 205 through 208 are each directed through enabled gate 42 to lead 90, thus delayed a period $3d$ of 150 nanoseconds, and each coincides with a successive check bit transition such that no further advance signals are provided by read circuit 92 on lead 93.

Each clock pulse on lead 90 is also directed over lead 91 to read-record control circuit 50, which is responsive to the last clock pulse during readout of the check bits in the control sector, that is clock pulse 208, to operate switches 20 and 26. Operation of switches 20 and 26 connects delay circuits 22 and 28 into the read clock pulse path between leads 19 and 32, thereby imposing an additional period of delay in the readout clock pulse path equal to approximately one-half bit period. This nominally centers clock pulse 209 and all successive clock pulses in the bit storage periods for subsequent readout from the succeeding information storage sector.

Figure 2D:
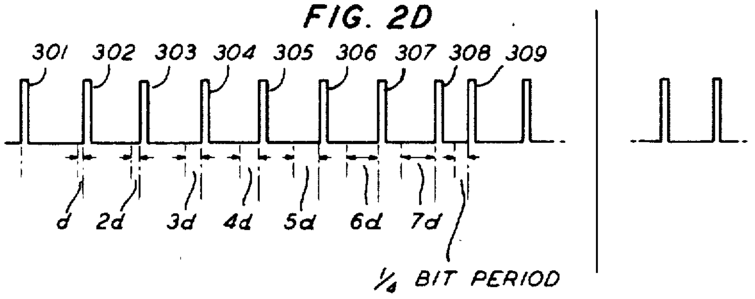

If after readout of all of the check bits coincidence is not obtained with one of clock pulses 201 through 208, shift register 36 will have been operated through a complete cycle and the bit therein will have been shifted out of the last stage of shift register 36 over lead 38 back into the first stage thereof. The resulting shift register output signal on lead 70 enables gate 40 again to direct all clock pulses on lead 32 therethrough over lead 90 to read circuit 92 for readout of the subsequent information. The fact that coincidence was not obtained indicates that the clock pulses through gate 40 on lead 90, without the interposition of any portion of delay line 35, are situated within the first quarter of the information bit periods. This read clock pulse situation is depicted in FIG. 2D of the drawing.

Thus, by switching approximately one-fourth bit period of delay into the read clock pulse path, clock pulse 309 and all successive clock pulses will be nominally centered in the bit storage periods for information readout. For this purpose, read-record control circuit 50 is responsive, via lead 94, to the cycling of the bit of information from the last stage of shift register 36 over lead 38 back into the first stage thereof for operating switch 20. Operation of switch 20 connects delay circuit 22 into the read clock pulse path between leads 19 and 32, delaying the clock pulses on lead 32 and thus on lead 90, by one-fourth bit period. Switch 26 remains unoperated, leaving delay circuit 28 out of the read clock pulse path.

In either event, upon completion of the readout of information from a storage sector, the timing arrangement in FIG. 1 is reset to its initial state preparatory for the next read or record operation. Shift register 36 is reset by read-record control circuit 50 via lead 57. Gate 40 is thus enabled by an output signal from shift register 36 on lead 70. Switches 16, 20 and 26 are disabled by read-record control circuit 50.

What has been described hereinabove is a simple, compact and economical arrangement for automatically controlling the timing of the readout of information from a multichannel storage medium so as to compensate for copy delay and other readout timing variations with respect to the individual channels. Although the illustrative arrangement described above utilizes multitapped delay line 35 and shift register 36 for varying the phase of the clock pulses incrementally to achieve a desired clock pulse phase relationship with the recorded check bits, it will be apparent that other known arrangements may be employed in accordance with the principles of my invention for varying the phase of the clock pulses. Moreover, although the above description of the particular illustrative arrangement of FIG. 1 assumes known comparator circuitry in read circuit 92 for detecting clock pulse and check bit transition coincidence and for advancing shift register 36 until such coincidence is obtained, it will be apparent that other known arrangements may be employed for achieving and detecting the desired phase relationship between the clock pulses and the check bits.

It is to be understood, therefore, that the above-described arrangements are merely illustrative of the principles of the present invention. Numerous other arrangements may be devised by those skilled in the art without departing from the spirit and scope of the invention.

What is claimed is:

1. In combination in a multichannel information storage system; a source of clock pulses of predetermined frequency; means responsive to said clock pulses for controlling the recordation and readout of binary information relative to individual storage areas in each channel of said storage system; and means for providing a predetermined phase relationship between said clock pulses and said information relative to each of said storage areas during readout which is substantially identical to the phase relationship between said clock pulses and said information during recordation in each said storage area comprising, means controlled by said clock pulses for recording a respective pattern of binary check digits in said storage system associated with the storage areas of each of said channels, clock pulse phase controlling means, means operative prior to readout of information from one of said storage areas of one of said channels for reading out said check digits associated with said storage area of said one channel and for directing said check digits to said controlling means, and means for concurrently connecting said source of clock pulses to said controlling means, said phase controlling means being responsive to said clock pulses and said check digits for controlling the phase of said clock pulses to obtain said predetermined phase relationship between said clock pulses and said check digits.

2. The combination in accordance with claim 1 wherein said clock pulse phase controlling means comprises means for varying the phase of said clock pulses until said clock pulses coincide with a predetermined portion of said binary check digits and means responsive to said coincidence for varying the phase of said clock pulses by a first fixed amount to obtain said predetermined phase relationship.

3. The combination in accordance with claim 2 wherein said phase varying means is operative to vary the phase of said clock pulses only over a period less than a binary digit storage period in said storage system, and wherein said clock pulse phase controlling means further comprises means operative in the event that coincidence is not obtained between said clock pulses and said predetermined portion of said check digits for varying the phase of said clock pulses by a second fixed amount to obtain said predetermined phase relationship.

4. The combination in accordance with claim 1 further comprising means operative prior to readout of information from said storage system and prior to operation of said clock pulse phase controlling means for automatically varying the phase of said clock pulses by a predetermined initial amount.

5. The combination in accordance with claim 1 wherein each of said channels of said storage system is arranged in a plurality of storage sectors each preceded by a respective control sector, and wherein said check digit recording means is controlled by said clock pulses for recording a respective pattern of said binary check digits associated with each of said storage sectors in the respective control sector preceding said individual storage sectors.

6. The combination in accordance with claim 5 wherein said respective check digit patterns each comprise a series of digits of alternating binary character, and wherein said clock pulse phase controlling means comprises means for varying the phase of said clock pulses until said clock pulses coincide with binary character transitions between adjacent check digits and means responsive to said coincidence for varying the phase of said clock pulses by a fixed amount to obtain said predetermined phase relationship.

7. The combination in accordance with claim 1 wherein said clock pulse phase controlling means comprises means for incrementally delaying successive ones of said clock pulses until said delayed clock pulses coincide with a predetermined portion of said binary check digits and for providing said delayed clock pulses to said readout controlling means during readout of information from said individual storage areas in the channel respectively associated with said check digits.

8. The combination in accordance with claim 7 wherein said clock pulse phase controlling means further comprises means responsive to said coincidence for varying the phase of said delayed clock pulses by a first fixed amount to obtain said predetermined phase relationship, and means operative in the event that said coincidence is not obtained for varying the phase of said clock pulses by a second fixed amount.

9. The combination in accordance with claim 8 further comprising means operative prior to readout of information from said storage system for automatically varying the phase of said clock pulses by a predetermined initial amount.

References Cited

UNITED STATES PATENTS

| | | | |
|---|---|---|---|
| 3,054,958 | 9/1962 | Bensky et al. | 328—56 |
| 3,226,685 | 12/1965 | Potter et al. | 340—172.5 |

ROBERT C. BAILEY, *Primary Examiner.*

R. RICKERT, *Assistant Examiner.*